Figure 14:
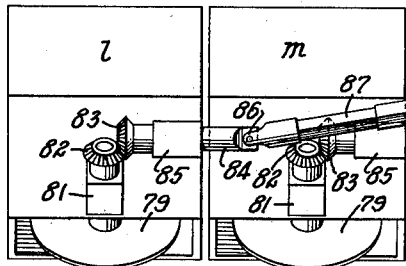

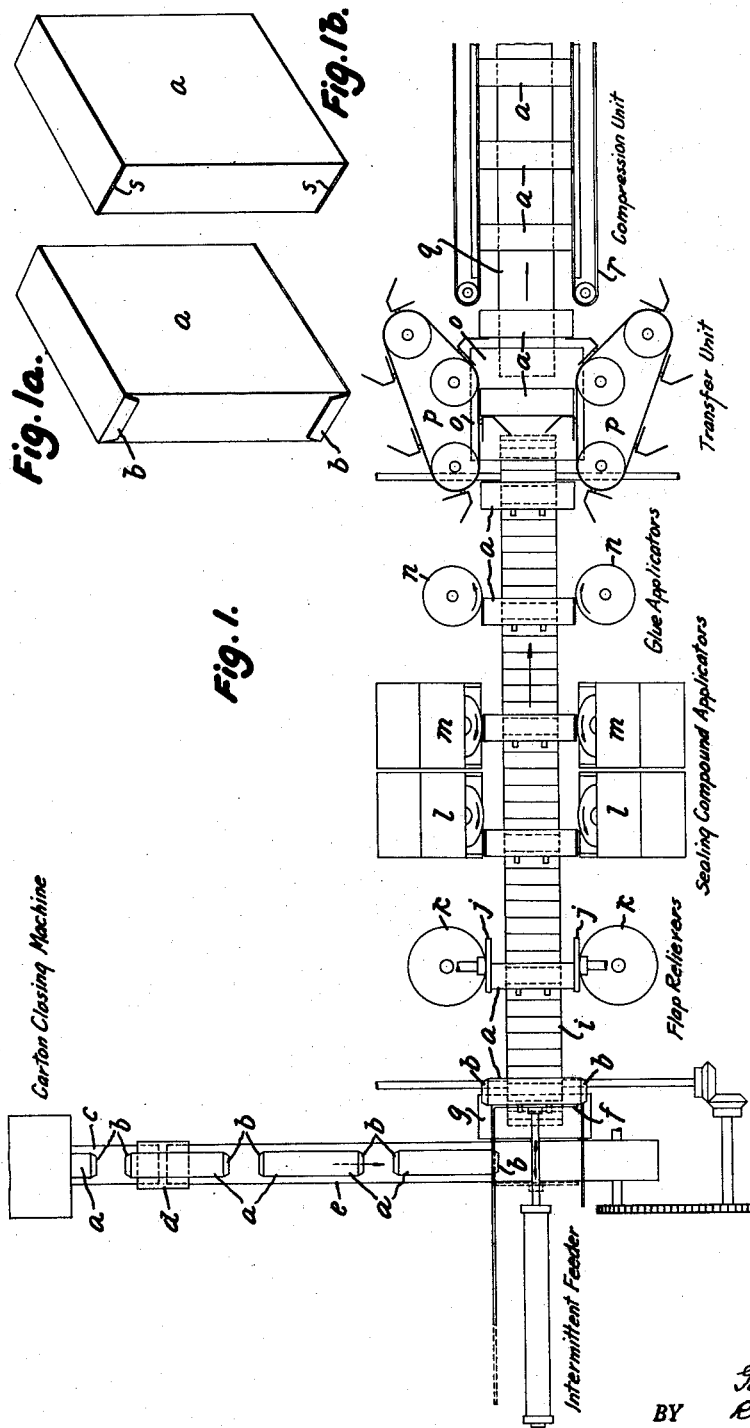

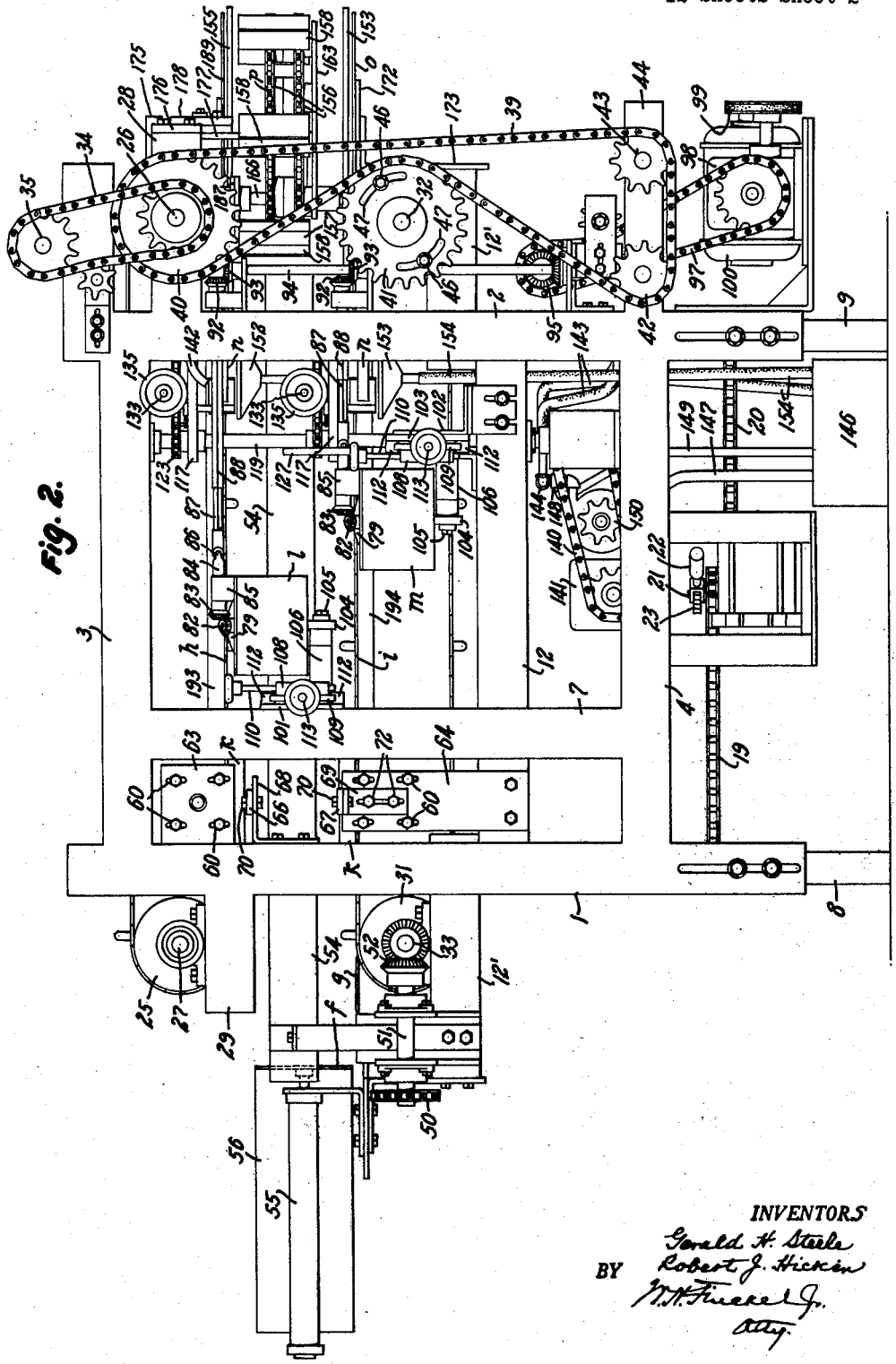

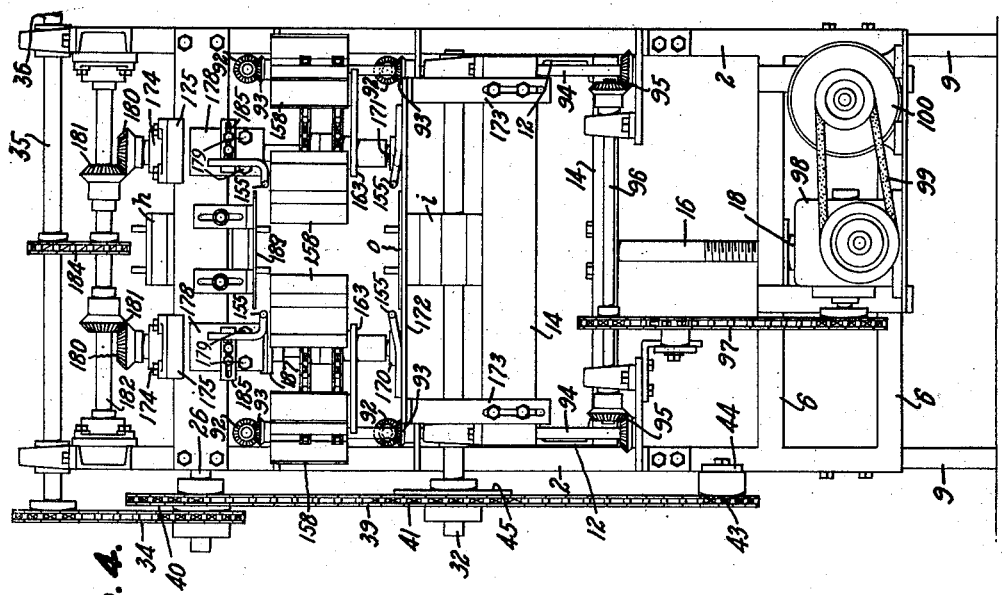

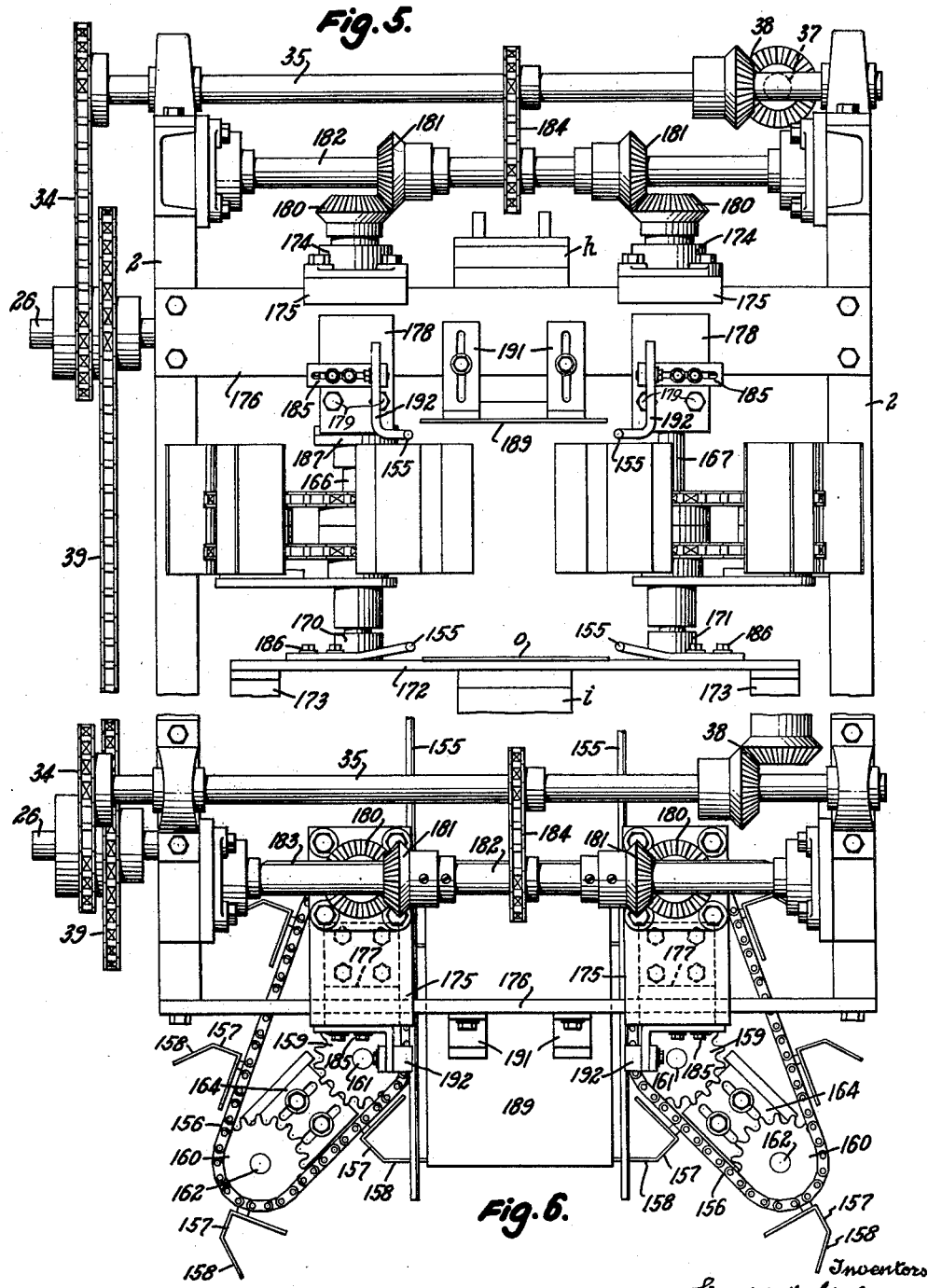

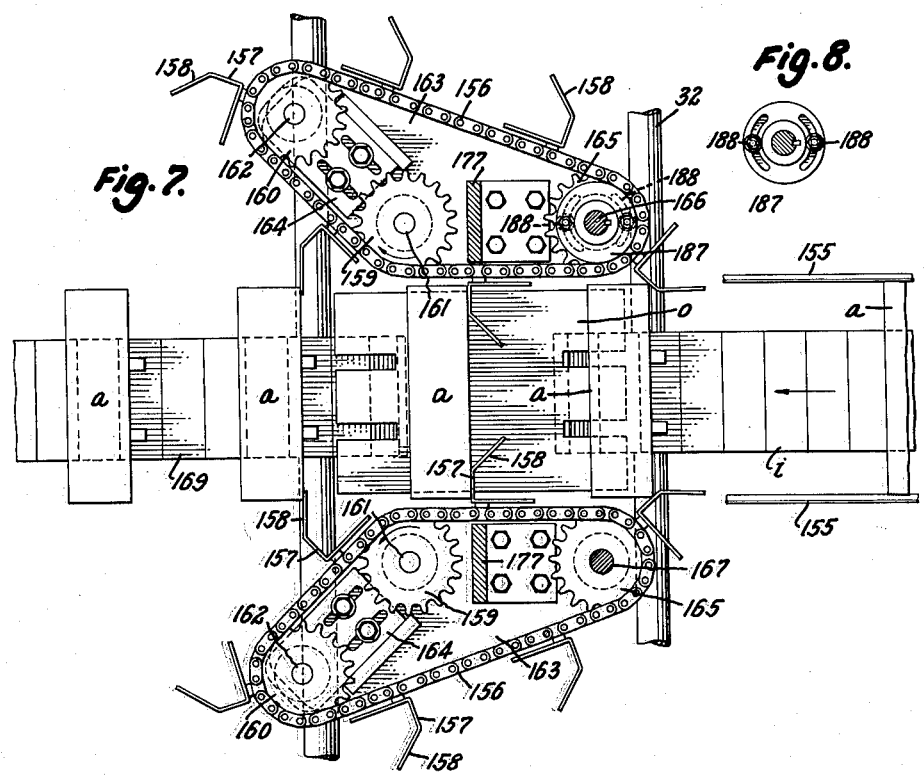
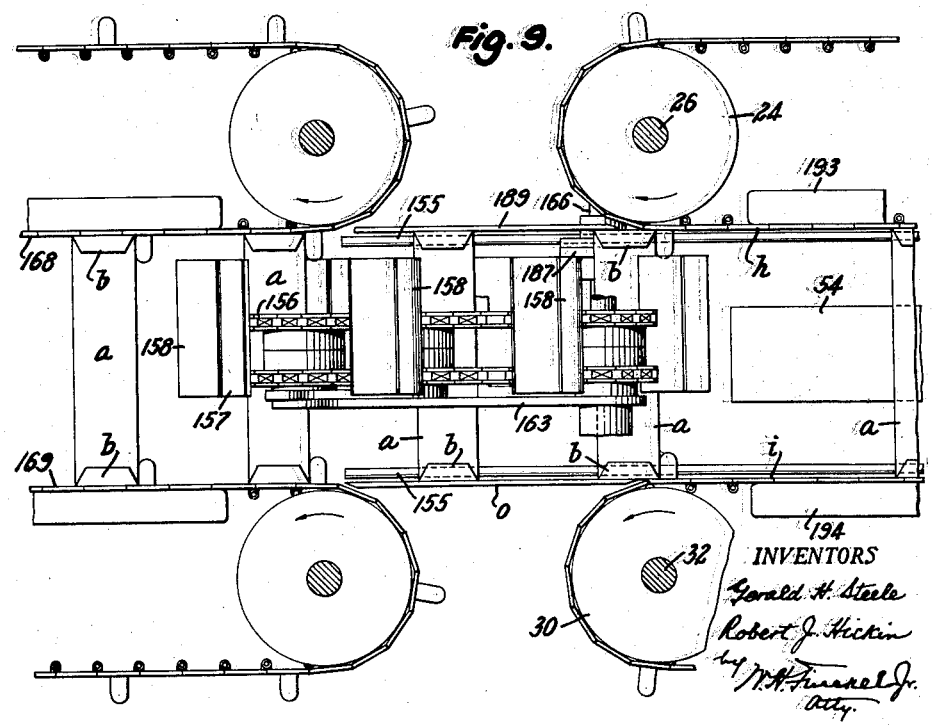

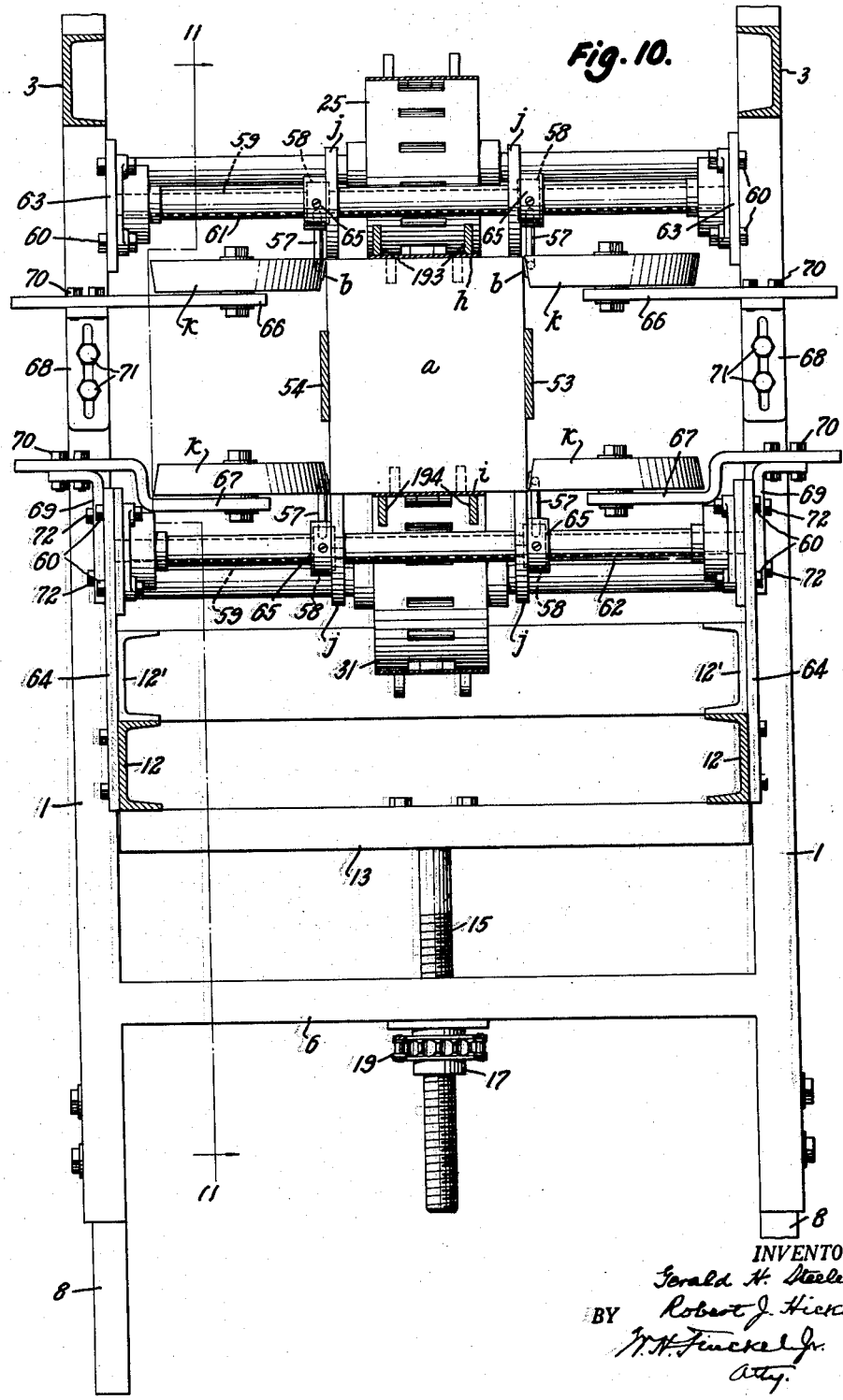

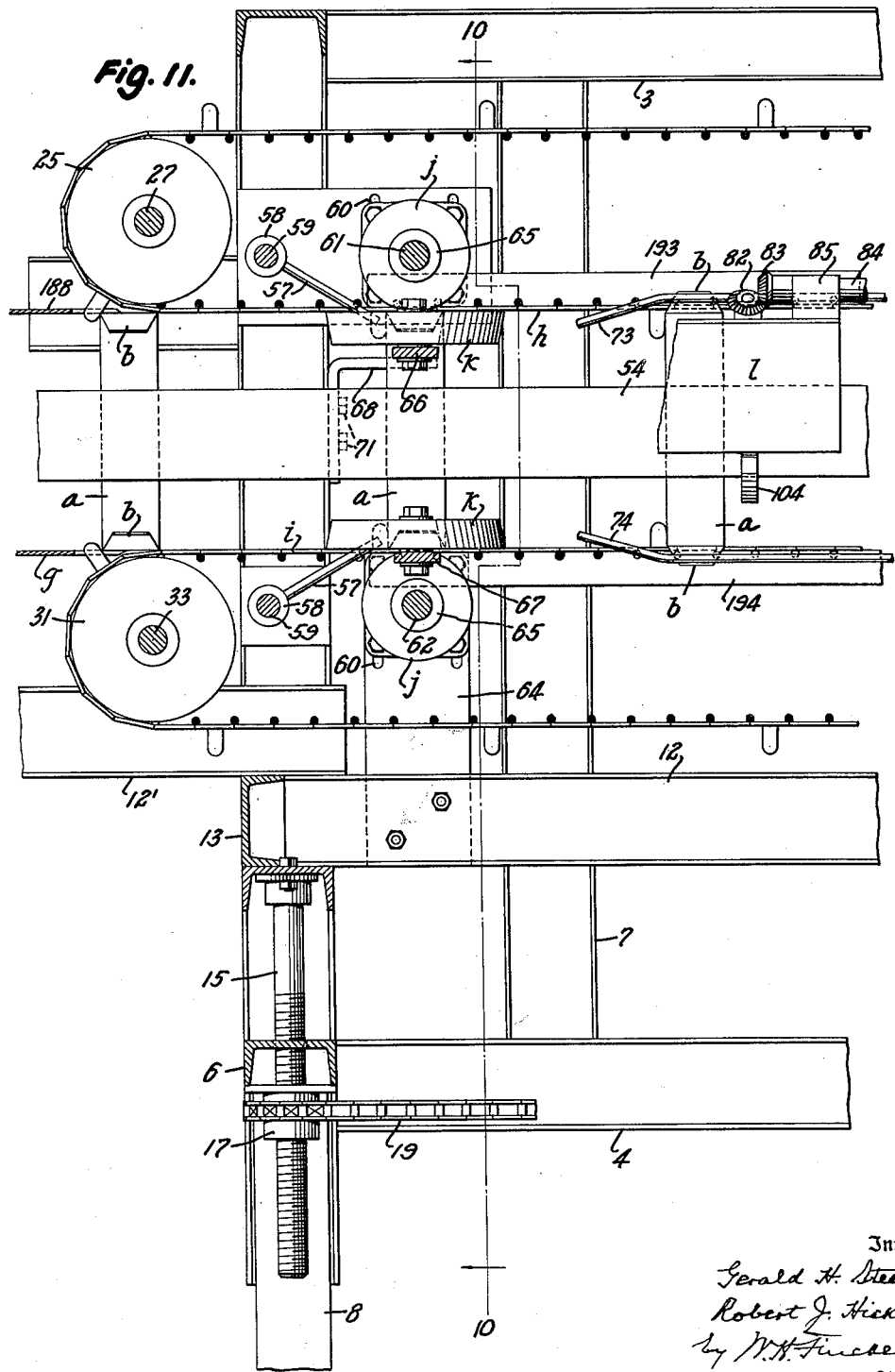

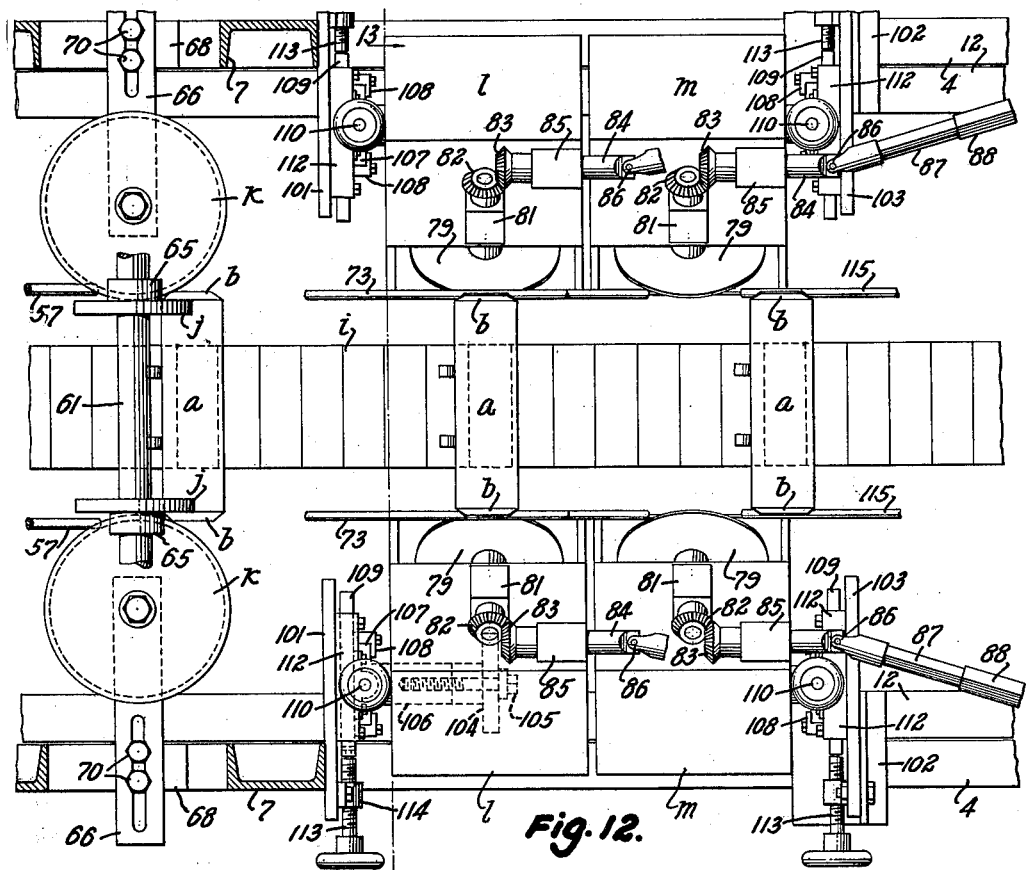

June 8, 1965

G. H. STEELE ETAL 3,187,483

CARTON SEALING APPARATUS

Filed Dec. 1, 1960

12 Sheets—Sheet 9

Inventors
Gerald H. Steele
Robt. J. Hickin
by
Attorney

June 8, 1965 G. H. STEELE ETAL 3,187,483
CARTON SEALING APPARATUS
Filed Dec. 1, 1960 12 Sheets-Sheet 10
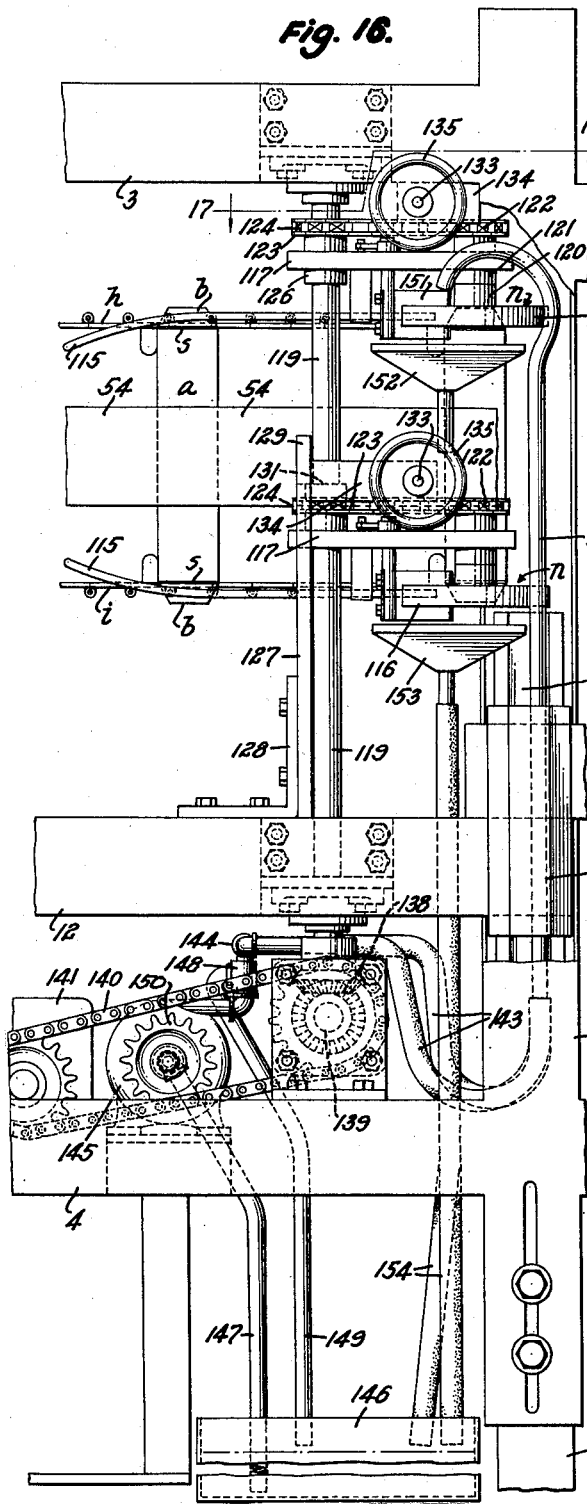
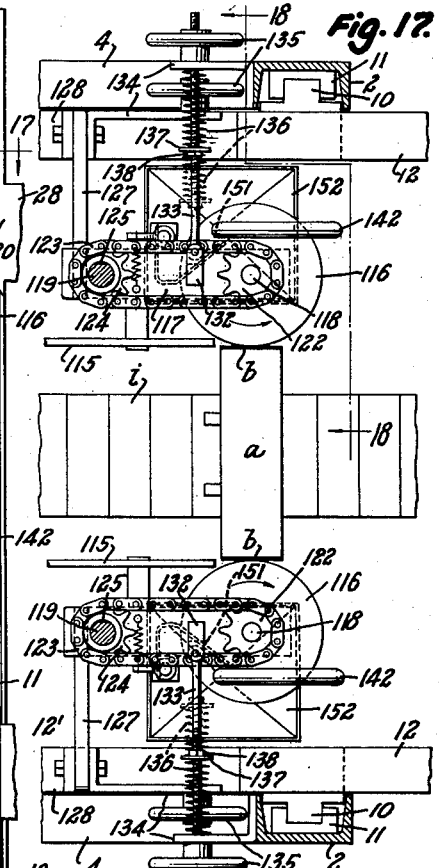
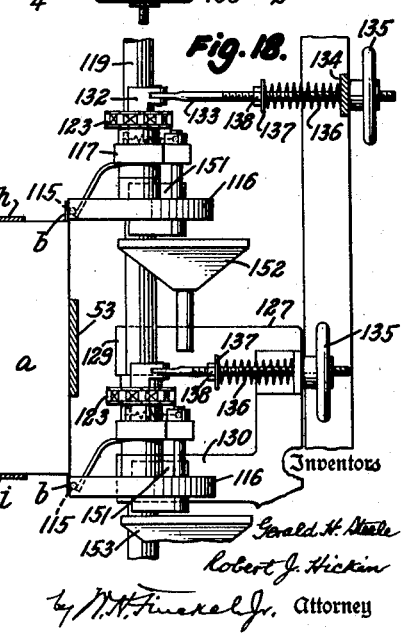
Inventors
Gerald H. Steele
Robert J. Hickin
by N. H. Finckel Jr. Attorney

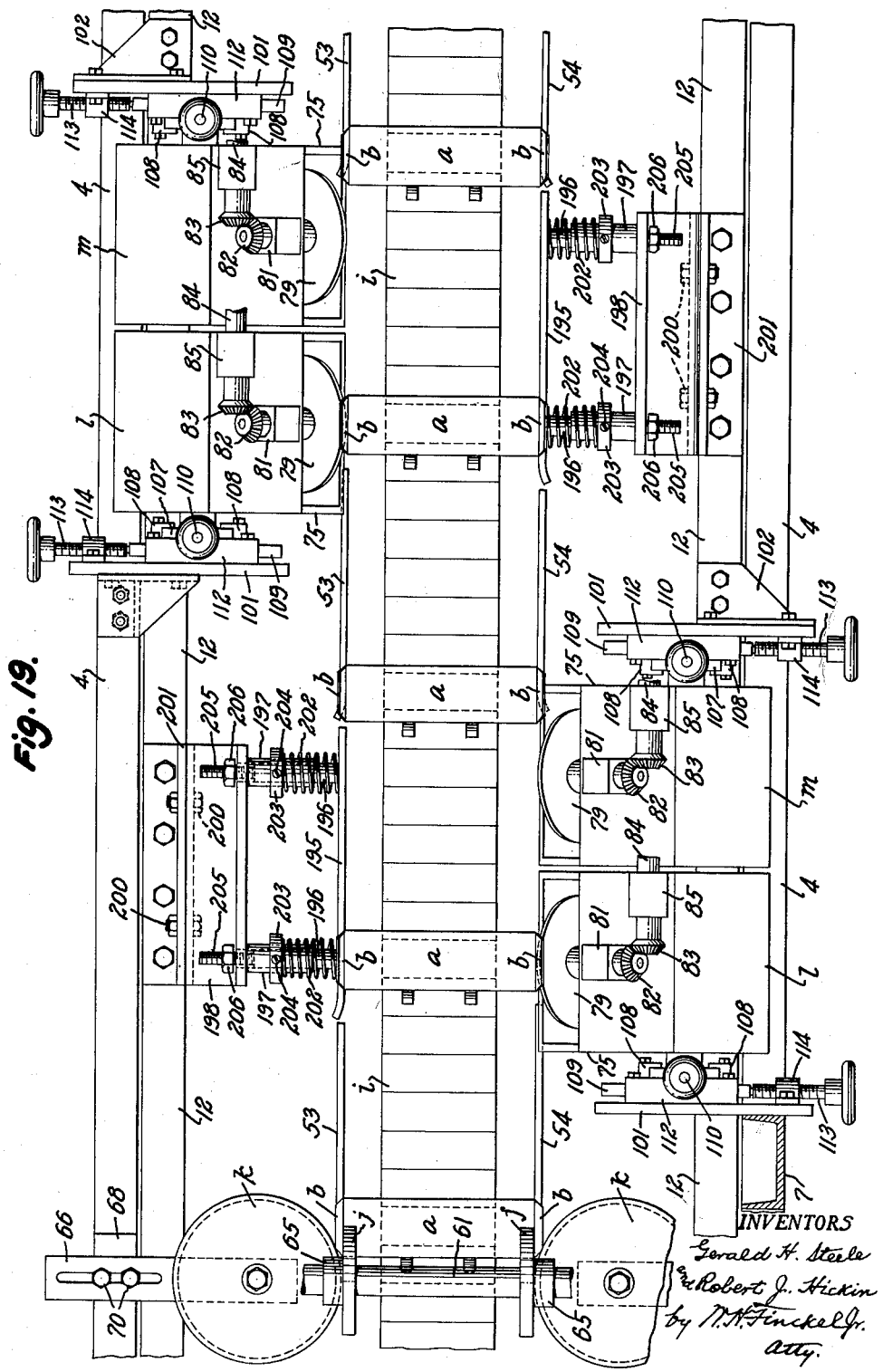

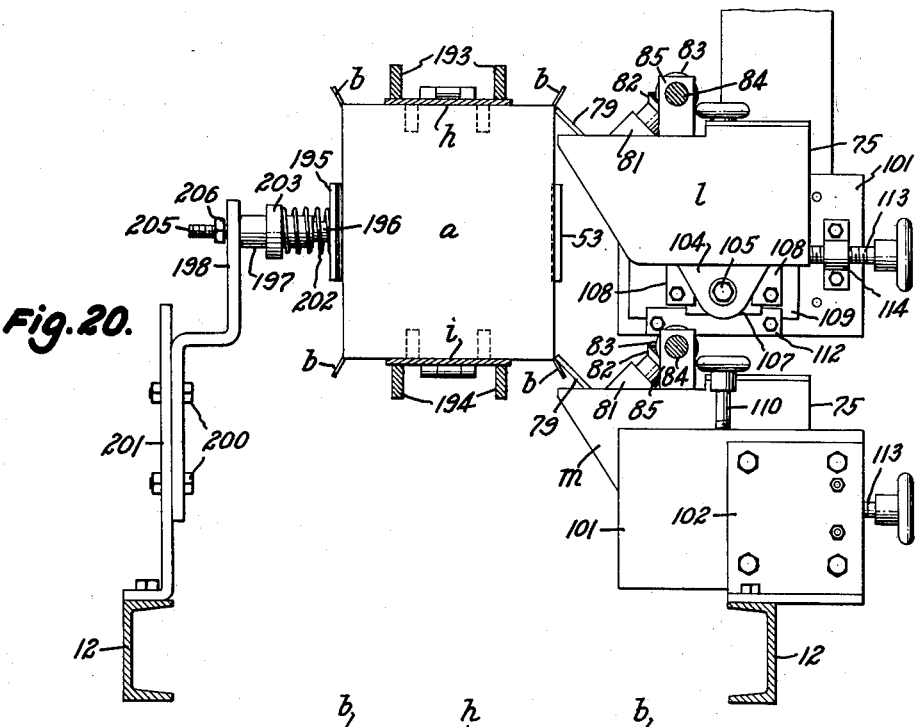
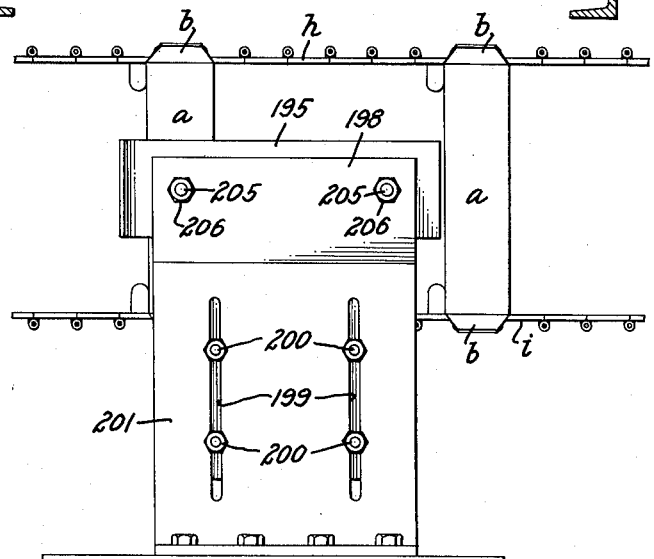

United States Patent Office 3,187,483
Patented June 8, 1965

3,187,483
CARTON SEALING APPARATUS
Gerald H. Steele, Leroy, and Robert J. Hickin, Seville, Ohio, assignors to Packaging Corporation of America, Rittman, Ohio, a corporation of Delaware
Filed Dec. 1, 1960, Ser. No. 73,147
9 Claims. (Cl. 53—374)

This invention relates to packaging machinery, and particularly to apparatus for sealing cartons, and this application is a continuation-in-part of applicants' copending application of the same title filed November 24, 1959, Serial No. 855,074, now abandoned, and is related also to their divisional application entitled Article Handling Mechanism, filed May 11, 1960, Serial No. 28,325, now Patent No. 3,037,609, granted June 5, 1962.

The apparatus of the invention is especially adapted for the provision of such sealing of the end closure flaps of cartons that, particularly, infestation of the carton contents from without will be prevented and, incidentally, undesired sifting of such contents from the cartons, will also be prevented.

To this end the apparatus is provided with means for introducing a normally non-hardening, although relatively settable, sealing or caulking compound into areas of the joints between the end closure flaps of cartons and, in reference to certain types of end closure flaps, such as those provided with so-called Van Buren ears, the apparatus is provided also with means for applying an adhesive (glue) to the flap parts, particularly to the Van Buren ears, thus adapting the apparatus for practicing the method of producing sealed cartons, as disclosed in the copending application of Robert J. Hickin and Daniel C. McCollough for patent for Method of Joining Paperboard Elements Using More Than One Kind of Adhesive and Carton Sealed by Such Method, filed July 30, 1958, Serial No. 752,021, now Patent No. 3,007,376, granted November 7, 1961.

With these purposes in view, broadly considered, one object of the invention is to provide apparatus which will receive, at an in-feeding station, in continuous succession, from a carton end-closing machine, an ordered plurality of filled cartons, the end closure flaps of which may already have been closed and glue secured, and continuously feed such cartons, in spaced relation, through a station at which the cauking compound is applied and, when certain of the carton end closure flaps are provided with Van Buren ears, through a station at which adhesive is applied to such ears, the thus treated cartons being then passed through a transfer station which feeds them into the receiving end of a compression unit through which the cartons pass, with pressure applied to their end-closing flaps, during a time interval sufficient to insure proper setting of all adhesive (glue) seals of such flaps.

Another object of the invention, having reference particularly to the operation of the apparatus upon cartons of the Van Buren ear flap type, is to provide means for preliminarily relieving the stiffness of the folding scores between such Van Buren ears and their carrying end closure flaps, to thus take the "fight" out of such scores and facilitate manipulation of the Van Buren ears and their ultimate sealing.

Another object of the invention is to provide apparatus in which all of the above described mechanical steps may be performed successively and automatically to thereby make possible handling of the cartons on a continuous production basis at relatively high speed; speeds of the order of three hundred cartons per minute being considered as possible.

Another object of the invention is to provide apparatus in which all of the mechanisms for performing the sealing and carton handling steps may be confined within a framework of relatively small size, thus making possible an economy in the floor space needed to accommodate a battery of the machines in a packing plant.

A further object of the invention is to provide at the transfer station mechanism which, in transferring the cartons from the apparatus of the invention to the compression unit, will so vary the relative spacing of the cartons from their original spacing in the said apparatus to that in the compression unit as to maintain the speed of production while at the same time providing for more efficient and less time-consuming continuous operation of the compression unit.

Another object of the invention is to provide the operative elements of the apparatus with means whereby they may be relatively adjusted so as to adapt the apparatus for operation, within predetermined limits, upon cartons of various sizes.

Another object of the invention is to provide apparatus in which the various carton-sealing effecting mechanisms may not only be adjusted to accommodate the apparatus to the handling of cartons of various sizes but may be operated optionally and selectively to accommodate cartons having a variety of closure characteristics.

With these and other objects in view, as will be apparent from the following description, the invention comprises apparatus adapted to feed a plurality of cartons, preferably filled and with their end closure flaps closed, in sequence through a plurality of operating stations at one of which a normally non-hardening, but relatively settable, sealing compound is applied to certain of the joints where such flaps meet, and, where certain of the flaps are provided with Van Buren ears, other stations of the apparatus preceding and following the station at which the sealing compound is applied, provided with means for preliminarily relieving the stiffness of the folding scores of the Van Buren ears prior to application of the sealing compound, and means, preferably operative subsequently to application of the sealing compound, for applying adhesive (glue) to the Van Buren ears; and the apparatus of the invention includes, also, means for properly positioning the Van Buren ears on their approach to the score stiffness relieving means, the sealing compound applying means, and the adhesive applying means, respectively, to provide for the most effective operation of these several means. The apparatus of the invention comprises, further, transfer means by virtue of which the cartons travelling through the apparatus at one preferred relative spacing may be introduced into a compression unit for travel therethrough at a different, and preferably closer, relative spacing, all as will be explained hereinafter more particularly and finally claimed.

In the accompanying drawings illustrating the invention, in the several figures of which like parts are similarly designated, FIG. 1 is a schematic plan view showing the various stations embodied in the apparatus of the invention and the mechanisms located at such stations, FIGS. 1a and 1b are perspective views of closed and sealed cartons of two of the types that the apparatus of the invention is adapted to handle in the sealing operation, FIG. 1a showing a carton of the type having certain of its closure flaps provided with Van Buren ears, and FIG. 1b showing a more conventional seal-end carton, FIG. 2 is a side elevation of the apparatus of the invention, FIG. 3 is an end view of the apparatus as seen from the left of FIG. 2, certain elements of the mechanisms positioned remote from such end being omitted in the interest of clearness, FIG. 4 is an end view similar, in detail, to that of FIG.

Figure 15:
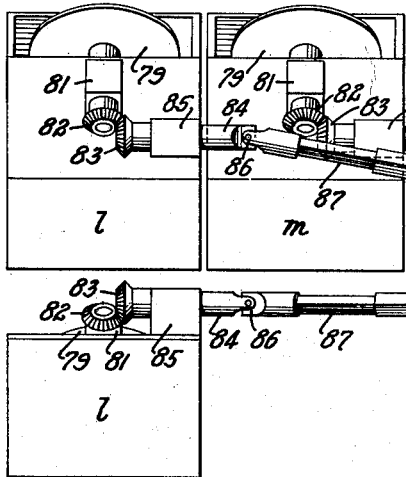

3 but showing the end of the apparatus as seen from the right of FIG. 2,

FIG. 5 is an enlarged, fragmentary end view of parts shown in FIG. 4 and disclosing, particularly, the carton transfer unit, FIG. 6 is a top plan view of the parts shown in FIG. 5, FIG. 7 is a sectional top plan view of the transfer unit, and illustrating the advancing transfer of sealed cartons from the conveyor belts of the apparatus to the conveyor belts of an associated compression unit, FIG. 8 is a sectional bottom view of the shaft adjusting means for a drive shaft of the transfer unit, FIG. 9 is a sectional side elevation of the mechanism shown in FIG. 7, FIG. 10 is a vertical sectional elevation taken on the line 10—10 of FIG. 11 looking in the direction of the arrows, FIG. 11 is a fragmentary longitudinal sectional elevation taken on the line 11—11 of FIG. 10 looking in the direction of the arrows, FIG. 12 is a fragmentary sectional plan view of the mechanisms for applying the sealing compound, the upper conveyor belt of the apparatus being omitted to better illustrate the feed of cartons past, and in engagement with, such mechanisms, FIG. 13 is a vertical sectional elevation taken on the line 13—13 of FIG. 12 looking in the direction of the arrows, FIG. 14 is a schematic plan view illustrating the mechanism for driving the applicator discs of the sealing compound applying mechanism, FIG. 15 is a side elevation of the parts shown in FIG. 14, FIG. 16 is an enlarged fragmentary side elevation of the right-hand end of the apparatus as seen in FIG. 2 and showing the adhesive (glue) applying mechanism, FIG. 17 is a fragmentary sectional plan view of parts shown in FIG. 16 with the section taken on the line 17—17 of FIG. 16, FIG. 18 is a fragmentary sectional end view of one pair of the glue applying mechanisms as seen on the line 18—18 of FIG. 17, but with the glue feeding pipe omitted, FIG. 19 is a view similar to FIG. 12, but showing a modified arrangement of the mechanism for applying the sealing compound, FIG. 20 is an end view of one of the presser plate mounting assemblies as viewed from the right of FIG. 19 and FIG. 21 is an outer side view of the mounting assembly shown in FIG. 20.

Having reference to operation of the apparatus upon cartons having closure flaps provided with Van Buren ears (FIG. 1a) for the sealing of which the apparatus is particularly adapted, and referring to the schematic showing of FIG. 1, it will be seen that filled cartons $a$ with their end closure flaps preferably closed and glue-sealed, but with the Van Buren ears $b$ freely off-standing, are fed from the carton closing machine upon a lugged link belt or other appropriate conveyor $c$ edgewise, and in uniformly spaced relation, over a dead plate $d$ and onto the conveyor belt $e$ of the apparatus of the invention from which they are intermittently fed by the appropriately timed reciprocation of a pusher plate $f$ over a dead plate $g$ and between the constantly traveling upper and lower lugged link conveyor belts $h$ and $i$, respectively, this intermittent feed, and the spacing of the lugs on the conveyor belts $h$ and $i$, serving to advance the cartons in a direction at right angles to their feed by the conveyor belt $e$, in other words broadside to their direction of travel, in predetermined relatively widely spaced relation, through the apparatus past the pairs of flap score relieving rollers $j$ and $k$, the upper and lower sealing compound applying mechanisms $l$ and $m$, respectively, and the glue applicator mechanisms $n$, whereafter they are moved by the conveyors $h$ and $i$ onto a dead plate $o$ whereon they are picked up by the finger plates of the paired elements $p$ of the transfer unit and discharged from the apparatus, in more closely spaced arrangement and with the Van Buren ears $b$ of their end flaps caulked with the sealing compound and glue-adhered to their adjacent walls, onto the conveyor belt $g$ of the compression unit $r$ through which they pass in such predetermined elapsed time as will serve to permit the glue to set.

If it is desired to operate upon cartons having the end closure flap characteristics of that shown in FIG. 1b, functioning of the flap score relieving means $j$–$k$, and of the glue applicator means $n$ may be dispensed with, and the sealing compound applicator means $l$ and $m$, or means having a similar function for applying the desired caulking seals $s$, FIG. 1b, only retained in operation on the cartons as they are conveyed through the apparatus.

Also, where the end construction of the cartons, or the sealing characteristics thereof, require actuation of the mechanisms of the apparatus at only one end or one side of such cartons, the mechanisms for operation upon their other sides or ends may be deactivated.

Having reference particularly to FIGS. 2, 3 and 4, it will be seen that the apparatus comprises a main frame having at its in-feed and discharge ends uprights 1 and 2, respectively, joined longitudinally by upper and lower beams 3 and 4, respectively, and laterally by upper and lower cross members 5 and 6, respectively, and adjacent to, but spaced from, the uprights 1 are vertical members 7 carried by and between the upper and lower beams 3 and 4.

The uprights 1 and 2 are provided with adjustable feet 8 and 9, respectively, whereby the height of the carton-supporting pass of the lower conveyor belt $i$ of the apparatus, primarily, may be accommodated to the similar belts $c$ and $q$ of the carton closing machine and the compression unit $r$, respectively.

Within the main frame and vertically slidable on the uprights 1 and 2 thereof on complemental slides 10 and ways 11 (FIGS. 16 and 17), is a sub-frame comprising longtiudinal beams 12, having rigid outward extensions 12' and transversely joined by cross members 13, 13 and 14, 14.

The mechanisms of the apparatus which operate upon the upper ends of the cartons $a$, including the upper conveyor belt $h$, are all mounted in relatively adjustable bearing means carried by the main frame, and the similar mechanisms which operate upon the lower ends of the cartons, including the lower conveyor belt $i$, the in-feed mechanisms $e$, $f$ and $g$, and the transfer mechanisms $o$ and $p$, are mounted in relatively adjustable bearing means carried by the sub-frame. Thus, relative vertical positioning of these upper and lower mechanisms may be effected by vertical adjustment of the sub-frame with respect to the main frame, and such adjustment is effected by means of similar jack screws 15 and 16 (FIGS. 3, 4, 10 and 11) disposed between the cross members 6, 13 and 6, 14 at opposite ends of the apparatus and engaged in nuts 17 and 18, respectively, to which similar, simultaneous rotation is imparted by chain and sprocket gearing 19 and 20 actuated from a common shaft 21 (FIG. 2) by means of a hand lever 22 and ratchet mechanism 23.

The upper conveyor belt $h$ is carried on conventional link belt sprockets 24 (FIG. 9) and 25 (FIG. 2) on driven and idler shafts 26 and 27, respectively, mounted in bearings carried, respectively, by arms 28 and 29 which form parts of the main frame uprights 2 and 1, respectively, and the lower conveyor belt $i$ is carried on similar sprockets 30 (FIG. 9) and 31 (FIG 2) on driven and idler shafts 32 and 33, respectively, mounted in bearings carried by the outward extensions 12' of the beams 12 of the sub-frame. Drive is imparted to the driven shaft 26 through chain and sprocket gearing 34 (FIGS. 2, 4, 5 and 6) from a drive shaft 35 to which rotation may be imparted from a separate source connected with its end 36 (FIG. 4) or from a motor or other source (not shown) which will drive a shaft 37 (FIG. 5) connected with the shaft 35 through miter gears 38 (FIGS. 5 and 6).

Rotation of the driven shaft 32 in synchronism with that of the shaft 26 is imparted by a chain 39 operatively connected with sprockets 40 and 41 on the shafts 26 and 32, respectively, and guided around suitable spacing and relatively adjustable tensioning sprockets 42 and 43 mounted upon an arm 44 on one of the main frame uprights 2. It will be appreciated that some means must be provided for maintaining the timing of linear travel of the conveyor belts $h$ and $i$ when the sprocket 41 of shaft 32 travels along the chain 39 during vertical adjustment of the sub-frame in the main frame in order that the carton-feeding lugs of the two chains may be properly aligned, and to this end the sprocket 41 is mounted for rotation upon the shaft 32 and is connected with a plate 45 (FIG. 4) by bolts 46 fixed in the plate 45 and passing through arcuate slots 47 in the sprocket 41. Thus, when the bolts 46 are loosened the sprocket 41 may travel along the chain 39 without imparting rotation to the shaft 32 and hence without disturbing the timing of the belt $i$ with respect to the belt $h$.

The belt $e$ of the feed-in mechanism (FIGS. 2 and 3) is mounted on a driving pulley 48 and an idler pulley 49 and drive is imparted to the driving pulley 48 through chain and sprocket gearing 50 from a backshaft 51 driven by miter gears 52 from the idler shaft 33 of the lower belt conveyor $i$ and is thus timed in linear travel to the linear travel of the upper and lower conveyor belts $h$ and $i$.

Travel of the cartons through the apparatus under the feed of the conveyor belts $h$ and $i$ is properly longitudinally aligned by guide plates 53 and 54 and the plate 54 is extended beyond the main frame and over the belt $e$ (FIGS. 2 and 3) so as to form a stop for cartons intermittently fed by this belt into feeding alignment with the conveyor belts $h$ and $i$ of the apparatus and in proper position for engagement by the pusher plate $f$. This pusher plate is reciprocated in timed relation to the travel of the conveyor belts $h$ and $i$ by the operation of the piston of an air cylinder 55 and it carries a buffer 56 which, upon feeding stroke of the pusher plate $f$, will arrest advance of the next-adjacent carton on the belt $e$.

Operation of the air cylinder to advance and retract the pusher plate $f$ in properly timed relation to the travel of the conveyor belts $h$ and $i$ will be controlled by more or less conventional electrically operated valve means (not shown) functioning in response to switches tripped, respectively, by trip means on one of the conveyor belts and trip means on the pusher plate $f$, or its buffer 56, so that when a lugged link of the conveyor belt approaches its position to pick up a carton from the dead plate $g$ the pusher plate will be advanced to push a carton into proper position on such dead plate and will then be immediately retracted. It will be apparent, also, that the trip means carried by the pusher plate will be adjustable with reference to the stroke of the plate so that the extent of the carton-advancing stroke of the pusher plate may be appropriately adjusted in consonance with the travel of the lugs of the conveyor belts $h$ and $i$.

As the cartons advance with the conveyor belts $h$ and $i$ into the apparatus their Van Buren ears are first engaged by the upper and lower pairs of depressor plow rods 57 (FIGS. 3, 10, 11 and 12) which are mounted for angular adjustment by their set-screw affixed collars 58 upon the similar upper and lower fixedly mounted bars 59, and the ears $b$ are plowed down and up into proximity to the adjacent walls of the carton (FIG. 10). Then these ears and the upper edges of the closed end flaps are passed in a pinch between the pairs of rollers $j$ and $k$ of the flap score relieving mechanisms to take the "fight" out the ears and facilitate their manipulation, and ultimate sealing, by subsequently acting mechanisms of the apparatus.

It will be noted that limited vertical adjustment of the rollers $j$ is made possible by virtue of the slotted bolting 60 of the bearings for their respective mounting bars 61 and 62 in the plates 63 and 64 which are affixed, respectively, to the main frame uprights 1 and the sub-frame beams 12, and that relative lateral adjustment of them on their mounting bars 61 and 62 is afforded by their setscrew secured hubs 65. The rollers $k$ are rotatably secured to upper and lower arms 66 and 67, which are mounted for relative lateral adjustment on upper and lower angle brackets 68 and 69 by slot and bolt connections 70 (FIG. 12), and their limited relative vertical adjustment is made possible by the slot and bolt connections 71 and 72, respectively, with the main frame uprights 1 and the plates 64 carried by the beams 12 of the sub-frame.

After the cartons have proceeded past the flap score relieving rollers $j$ and $k$, and their Van Buren ears $b$ have sprung outward slightly, these ears are engaged by upper and lower pairs of plow rods 73 and 74 (FIGS. 4, 12 and 13) which serve to turn them out at angles of approximately 48° to the adjacent carton walls (FIG. 13) in which arrangement they pass proximate to the pairs of upper and lower sealing compound applicators $l$ and $m$ for application in the apexes of the angles (or crotches) formed between them and the said carton walls of beads of the sealing compound.

These sealing compound applicators each comprise a similar pot 75 the lower wall 76 of which (see upper left of FIG. 13) is provided with bores 77 to receive electric heating elements (not shown) by which the contained bath 78 of sealing compound is maintained at the proper temperature for desired fluidity. Dipping into the bath 78 is an applicator disc 79 provided with a doctor blade 80 and mounted at an angle of 45° for rotation with a shaft mounted in a bearing 81 and carrying a driven miter gear 82 meshed with a complemental gear 83 on a stub shaft 84 having a bearing 85.

The stub shafts 84 of the miter gears 83 are connected through universal joints 86 (see FIGS. 14 and 15) with the adjacent elements 87 of telescoping shafts the other elements 88 of which have their ends connected through universal joints 89 with stub shafts 90 carried in bearings 91 fixed to the main frame uprights 2. These stub shafts 90 carry miter gears 92 meshing with complemental gears 93 on vertical shafts 94 at opposite sides of the discharge end of the apparatus (see FIGS. 2 and 4), and these shafts are driven by miter gear sets 95 from a cross shaft 96 which in turn is driven through chain and sprocket gearing 97 from a change-speed gear 98 and belt and pulley drive means 99 by an electric motor 100.

It is to be noted that for most of the appropriate sealing compounds employed in the sealing method for the practice of which the apparatus is designed the peripheral travel of the applicator discs 79 will be counter to the direction of travel of the cartons in order to build up in the crotches between the ears $b$ and the adjacent carton walls appreciable beads of the said compound, but this direction of travel of the discs is a matter which will be dictated by conditions of use and is hence optional.

As shown particularly in FIGS. 2, 12 and 13, each of the pots 75 is mounted for limited vertical and lateral movement, such mounting means for the pots of the upper applicators $l$ being secured by plates 101 to the vertical members 7 of the main frame and those for the pots of the lower applicators being secured by brackets 102 and plates 103 to the beams 12 of the sub-frame. The mounting means include a lug 104 offstanding from the bottom 76 of the pot 75 by which the pot is rigidly bolted at 105 (FIG. 12) for angular adjustment to a horizontal post 106 carried by a vertical slide plate 107 vertically adjustable in guides 108 affixed to a horizontal slide plate 109 by means of a hand screw 110 threaded through a bearing element 111 secured to the horizontal slide plate 109. The horizontal slide plate 109 is horizontally adjustable in guides 112 affixed to the adjacent plate 101 or 103 by means of a hand screw 113 threaded through a bearing element 114 secured to such plate. By means of these mounting elements it will be seen that the pots 75 of the sealing compound applicators *l* and *m* may be given limited angular, vertical and horizontal adjustment in order to locate the peripheries of their applicator discs 79 in proper relation to the crotches between the Van Buren ears *b* of the cartons and their adjacent carton walls to effectively accommodate the applicators to cartons of various sizes. In addition to these limited adjustments the lower applicators *m* can be vertically adjusted bodily, with the sub-frame of the apparatus, as hereinbefore noted.

In this matter of limited and bodily adjustment of the pots 75 it will be understood that the drive of their applicator discs 79 through the sets of miter gears 82–83 and 92–93 will be maintained effective by automatic accommodation of the telescoping and universally jointed drive shafts 87–88.

Having reference particularly to FIGS. 2, 16, 17 and 18, it will be seen that after the cartons leave the sealing compound applicators *l* and *m*, with beads *s* of sealing compound applied (FIG. 16), and approach the glue applicators *n* their Van Buren ears *b* are engaged by plow rods 115 which serve to plow these ears into vertical position (FIG. 18) so that they will be presented for proper wiping engagement with the peripheries of the glue wheels 116 of these applicators (FIGS. 17 and 18). The glue applicators, except for the differences between the mounting of the upper pair and the lower pair, are essentially the same in construction and mode of operation. Each applicator includes a base member 117 of elongated form provided adjacent to each end with a bore through one of which the shaft 118 of the glue wheel 116 extends and the other of which permits passage of a vertical drive shaft 119. The glue wheel 116 is held in predetermined spaced relation to the lower surface of the base member 117 by its hub 120 and a collar 121 surrounding its shaft 118, and above the base member, and in spaced relation thereto, the shaft 118 carries a sprocket 122 through which rotation is imparted to the glue wheel 116 by a chain 123 driven from a sprocket 124 fixed for rotation with, but axially adjustable of, the drive shaft 119 as by a set screw (not shown) engageable with a flat surface 125 extending longitudinally on the shaft.

Vertical adjustment of the upper glue applicators, which are wholly supported by their shafts 119, is made possible by collars 126 adapted for fixed adjustment, by set screws (not shown) longitudinally of the shafts 119 and bearing against the lower surfaces of the base members 117, and vertical adjustment of the lower glue applicators in consonance with similar adjustment of the sub-frame is made by yoke brackets 127 affixed by angles 128 to the beams 12 of the sub-frame with the upper and lower arms 129 and 130 (FIG. 18) bearing, respectively, against collars 131 surrounding the shafts 119 above the sprockets 124 and against the lower surfaces of the base members 117.

It will be apparent that, by this arrangement of cooperating elements, the glue applicators, while retained in such appropriate vertical arrangement as to properly present their glue wheels 116 in desired horizontal alignment with the ears *b* of the cartons, are capable of swinging, or angular, movement on the shafts 119 in order to adjust the glue wheels 116 in desired wiping, glue-depositing, contact with such ears. It has been found desirable to have this wiping contact resiliently controlled, and to this end the base member 117 is provided with a bracket 132 to which is pivoted one end of an adjusting rod 133 the other end of which is screwthreaded and passes freely through a relatively fixed abutment plate 134 against which bears an adjusting knob 135 complemental to the screwthreaded end of the rod 133. Resilient pressure is obtained by a spring 136 confined between the abutment plate 134 and a washer 137 adjustable along the screwthread of the rod 133 by a nut 138. By these means the approach of the glue wheel 116 to its respective Van Buren ear *b* may be controlled by adjustment of the knob 135, and the resilient pressure of the glue wheel against such ear may be controlled by adjustment of the washer 137.

The shafts 119 are synchronously driven by sets of miter gears 138 paired at their ends and at the ends of a jack shaft 139 driven by chain and sprocket gearing 140 from an electric motor and gear box 141 (see FIG. 16) carried by the main frame.

Each of the upper glue wheels 116 is supplied with liquid glue through a goose-neck pipe 142 (FIGS. 16 and 17) connected by a flexible tube 143 with a manifold 144 into which the glue is pumped by a pump 145 from a glue reservoir 146 by way of a pipe 147. The manifold 144 is provided at its inlet with an adjustable pressure responsive by-pass valve 148 from which excess glue is returned to the reservoir 146 through a pipe 149. The glue pump 145 is driven by a sprocket 150 in driven engagement with one pass of the chain and sprocket gearing 140 of the jack-shaft 139.

Excess of glue supplied to the upper glue wheels 116 by the pipes 142 is doctored off of the upper surface and advancing periphery of each of these glue wheels by a spring-biased doctor blade 151 and drains into a funnel 152 from the depending spout of which it falls upon the complemental lower glue wheel 116, and excess of glue thus supplied to the lower glue wheels is doctored therefrom by their doctor blades 151 similar to those of the upper glue wheels and falls into funnels 153 from the spouts of which it runs into tubes 154 and drains back into the reservoir 146.

Although not specifically so shown in the drawings, the functionally effective peripheries of the applicator discs 79 of the sealing compound applicators *l* and *m* and of the glue wheels 116 are preferably of intaglio or pitted type substantially as shown in the patent of Robert J. Hickin for Intaglio Glue Mechanism No. 2,787,244, granted April 2, 1957.

Having reference to FIGS. 2 and 4 to 9, it will be seen that when the cartons are advanced by the conveyor belts *h* and *i* past the glue applicators, with glue applied to the under faces of the Van Buren ears *b*, these ears, which then, due to their inherent springiness, have assumed positions offstanding from the adjacent carton walls, will be engaged by plow rods 155 and turned in against the adjacent carton walls with the glue on their under (inner) faces in sealing contact with such walls and the beads *s* of sealing compound compressed into more intimate association with the adjacent joints of the end sealing flaps of the cartons.

Thus engaged between the plow rods 155, and guided by the guide plates 53 and 54, the cartons are advanced by the conveyor belts *h* and *i* onto the dead plate *o* in the zone of operation of the elements *p* of the transfer unit (FIG. 1).

Each element *p* of the transfer unit preferably comprises a pair of vertically spaced, horizontally travelling, chains 156 (FIGS. 7 to 9) to which are attached vertically arranged, linearly spaced, wing fingers each of which has two carton-contacting faces 157 and 158 disposed at an angle of 45° to each other. The chains 156 pass around idler sprockets 159 and 160 having their shafts 161 and 162 stepped, respectively, in a base plate 163 and in an adjustable chain tensioning slide 164 mounted on the base plate 163, and around drive sprockets 165 carried by drive shafts 166 and 167. It will be noted that the shafts 166 and 167 of the drive sprockets 165, and the shafts 161 of the idler sprockets 159, as well as the chain-carrying peripheries of these sprockets, are so related that the effective carton-adjacent passes of the chains 156 are longitudinally parallel to the direction of travel and to each other, but that the shafts 161 and 162 of the idler sprockets 159 and 160, and the chain carrying peripheries of these sprockets, are so disposed that the carton-adjacent passes of the chains between these sprockets are at an angle of 45° to the direction of travel of the cartons. By this arrangement, as will be apparent from FIGS. 6 and 7, the faces 157 of the wing fingers will be effective to advance the cartons with and between the parallel passes of the chains 156 and the faces 158 of such fingers will be similarly effective between the 45° divergent passes of these chains, the transition from parallel to divergent travel of the chains causing the wing fingers to push the cartons by a somewhat rolling contact of the angles of junction of the faces 157 and 158 with the cartons.

It will be noted that the effective feeding spacing of the wing fingers along the chains 156 is less than that of the spacing of the lugged links of the conveyor belts $h$ and $i$, and hence the linear travel of these chains is so gauged that an opposite pair of the wing fingers will be in position to pick up and advance a carton as soon as it is delivered by the belts $h$ and $i$ to the dead plate $o$, substantially as indicated in FIG. 7.

The transfer unit will successively deliver the cartons in uniform, spaced arrangement to the belts ($q$) 168 and 169 (FIG. 9) of the compression unit $r$, and these belts may be either lugged, as shown, or of plain friction surface type.

With reference to FIGS. 5 and 6, it will be seen that the lower ends of the drive shafts 166 and 167 may be engaged by and vertically slidable in bearings 170 and 171 slidably carried by a platform 172 adjustably supported on the cross member 14 of the sub-frame by brackets 173, the upper ends of these shafts passing through bearings 174 carried by clamp members 175 relatively laterally adjustable on a transverse beam 176 secured to the ends of the arms 28 of the main frame uprights 2. The two clamp members 175 suspend the base plates 163 of their respective two elements $p$ of the transfer unit by brackets 177 attached to them and to the base plates, and clamping of the members 175 on the beam 176 is effected by plates 178 bolted to these brackets 177 and secured in frictional clamping engagement with the beam 176 by bolts 179 (FIGS. 4 and 5).

The drive shafts 166 and 167 have affixed to their upper ends miter gears 180 mated with their complements 181 which are axially slidable upon a transverse shaft 182 provided with a spline 183 (FIG. 6) which locks the gears 181 for rotation with the shaft 182 which derives its drive through chain and sprocket gearing 184 from the drive shaft 35.

The lateral adjustability of the elements $p$ of the transfer unit and the drive means associated therewith, including the miter gears 181, makes it possible to accommodate these elements to cartons of various lateral dimensions, and similar accommodation of the upper and lower pairs of plow rods 155 is effected by their bolt and slot mountings 185 and 186 on the clamping plates 178 and platform 172, respectively.

In order that the wing fingers 157-158 of the chains 156 of the two transfer elements $p$ may be transversely aligned for proper simultaneous engagement with the cartons, to thus transfer the cartons without lateral misalignment and possible jamming of their feed, the drive shaft 166 is divided by a two-part coupling 187 (FIGS. 7 and 8) to the separate parts of which the adjacent ends of the shaft 166 are keyed, these two separate parts of the coupling, and the respective parts of the shaft keyed thereto being relatively angularly adjustable and being secured in adjusted union by the slot and bolt connections 188 (see FIG. 8). Thus, the relative setting of the chains 156 driven by the shafts 166 and 167 may be so adjusted as to bring operation of their respective wing fingers into desired synchronism.

As shown in FIGS. 2 to 6 and 11 the in-feed and discharge ends of the apparatus are provided with carton top guides 189 and 190, respectively, both of which are preferably vertically adjustable as by slotted and bolted brackets 191 as shown, particularly, in FIGS. 5 and 6.

One of the advantageous features of the transfer unit is that it makes possible relatively gentle handling of the cartons after they leave the conveyor belts $h$ and $i$, having been moved by these belts onto the dead plate $o$. This gentle handling is accomplished, primarily, due to the relatively closer spacing of the wing fingers 157-158, in regard to the spacing of the carton-moving lugs of the conveyor belts and to the divergent travel of these wing fingers at opposite sides of the machine. Hence, the chains 156 which carry the wing fingers may have a linear travel slower than that of the conveyor belts $h$ and $i$ and the wing fingers will be moved into contact with the cartons successively and intermittently fed by the belts relatively slowly, and their contact with and movement of the cartons over the dead plate $o$ will be gentle, and will, moreover, particularly when freshly glued cartons are being fed, be out of those areas of the cartons adjacent to the end closure flaps where the glue-sealing of the cartons has been effected. Also, due to the 45° angle of travel of the chains 156 at their divergence, not only will the linear speed of transfer travel of the cartons be further reduced but the faces 158 of the wing fingers will be maintained in flat, laterally-sliding contact with the trailing faces of the cartons and thus will have no tendency to mar or crush them while in such contact during their discharge to the compression unit. Furthermore, as the cartons are moved by the transfer unit, they will be in contact primarily only with the dead plate $o$, but guided at their upper ends, although only lightly, by the top guide 190.

For proper linear support of the operative passes of the conveyor belts $h$ and $i$ in contact with the tops and bottoms of the cartons carried between them pairs of fixed rails 193 and 194, respectively, bear against their outer surfaces, as shown, for example, in FIGS. 2, 9, 10, 11 and 13.

In the modification illustrated in FIGS. 19 to 21, provision is made for accommodating the sealing compound applicator means of the apparatus to cartons having slight variations in their lateral dimensions. As therein shown the upper and lower pairs of applicator means at the two sides of the path of travel of the cartons with the conveyor belts $h$ and $i$, instead of being located directly opposite each other, as shown particularly in FIGS. 1, 12 and 14, are offset longitudinally of such path of travel a distance sufficient to accommodate opposite each pair a contact presser rail 195 supported by stem and slide means 196, 197, respectively, upon a mounting plate 198 secured for limited vertical adjustment by slot and bolt connections 199, 200 to a bracket 201 carried by the respective adjacent longitudinal beam 12 of the sub-frame.

Springs 202 embracing the slide means 197 and bearing at their opposite ends against the presser rails 195 and stop collars 203 carried by the slide means 197 serve to bias the presser rails into contact with adjacent walls of the cartons travelling with the conveyor belts $h$ and $i$ to thus force the cartons with non-crushing pressure into proper intimate engagement with the peripheries of the applicator discs 79. The stop collars 203 may be adjusted axially of the stem means 197 to appropriately vary the pressure exerted by the springs 202, and such adjustment may be retained by set screws 204.

Ordinarily, the crowding movement imparted by the presser rails 195 to the travelling cartons against the applicator discs 79 need be no more than one-eighth inch and the stem means 196 are provided with screwthreaded extensions 205 carrying adjustable stop nuts 206 to limit such movement. It will be appreciated, moreover, that this provision for lateral adjustment of the presser rails can serve the additional function of accommodating the presser rails for operation on cartons of the various sizes which the apparatus of the invention is designed to handle, having reference to the normal lateral dimensions of such cartons. Also, the vertical adjustment of the presser rails afforded by their slot and bolt connections 199, 200 with the brackets 201 serves, in combination with the hereinbefore described vertical adjustment of the sub-frame of the apparatus, to properly locate the presser rails relative to cartons of the various vertical dimensions which the apparatus is designed to handle.

It will be apparent that when the apparatus is equipped with the modifications of FIGS. 19 to 21 slight variations in the lateral dimensions of cartons in a run thereof through the apparatus will have no tendency to result in improper or inefficient application of the beads of sealing compound inasmuch as the presser rails 195 will serve, under the bias of their springs 202, to crowd the travelling cartons against the peripheries of the applicator discs 79.

Various changes and modifications are considered to be within the principle of the invention and the scope of the following claims.

What we claim is:

1. In apparatus for sealing cartons of the type having a plurality of side walls carrying a plurality of relatively foldable end closure flaps which are assembled in lapped relation with their edges adjacent to certain of said side walls, at least one of said flaps having at its opposite free edges normally offstanding ears for folded engagement with adjacent side walls of the carton and forming with said side walls when offstanding therefrom crotch-like joints, a sealing-compound applying station, means for presenting cartons at said station, sealing-compound applying means at said station having applicator means disposed exteriorly of, adjacent to, and facing said certain side walls and in operative proximity to said joints between said ears and their adjacent side walls and so formed as to deposit the sealing compound in bead-like strip form in areas confined to said crotch-like joints, and means for applying pressure to said lapped flaps and to said ears to thereby effect a sealing of the thus-applied sealing compound in said crotch-like joints behind said ears.

2. Apparatus as defined in claim 1, and including means for applying adhesive to the faces of said ears adjacent to their said adjacent side walls in order to enable said ears to be adhesively affixed to said side walls in overlapping relation to the deposited bead-like strips of sealing compound.

3. Apparatus as defined in claim 1, and including means for holding said ears in angularly spaced relation to their said adjacent side walls in order to form appropriate crotches in which the bead-like strips of sealing compound may be deposited.

4. In apparatus for sealing cartons of the type having a plurality of side walls, and a plurality of relatively foldable end closure flaps which are assembled in joined lapped relation, a main frame, a sub-frame vertically adjustable relative to said main frame to thereby accommodate the apparatus to operation upon cartons of various vertical dimensions, a first travelling conveyor belt carried by the main frame, a second travelling conveyor belt carried by the sub-frame and vertically adjustable therewith and with respect to the conveyor belt carried by the main frame, the lower and upper passes of said first and second conveyor belts, respectively, adapted to receive between them cartons fed to them and to contact the lapped end closure flaps at opposite ends of said cartons to thus feed the cartons through the apparatus, sealing-compound depositing means disposed in the apparatus at opposite sides of the cartons fed by said belts and in staggered relation longitudinally of said belts to thereby provide spaces opposite them relative to the cartons, said sealing compound depositing means being provided with applicator means for applying to predetermined joints of certain of the carton end closure flaps at opposite sides of the cartons bead-like strips of a fluid sealing compound, and means disposed in said spaces and engaging the fed cartons for yieldingly crowding the cartons into operative proximity to said applicator means of the respective oppositely disposed sealing-compound depositing means.

5. Apparatus as defined in claim 4, in which each of said crowding means includes a presser rail resiliently biased into contact with the sides of the fed cartons which are opposite the sides thereof engaged by said applicator means.

6. Apparatus as defined in claim 5, in which said crowding means are provided with mounting means for supporting them upon and for vertical movement with said sub-frame, and the presser rails thereof are supported on said mounting means by means providing for their adjustment laterally and vertically of the path of travel of said cartons.

7. In apparatus for sealing cartons of the type having a plurality of side walls, and a plurality of relatively foldable end closure flaps which are assembled in joined lapped relation and certain of which are provided at their free edges with offstanding ears joined thereto by folding scores, a main frame, a sub-frame vertically adjustable relative to said main frame to thereby accommodate the apparatus to operation upon cartons of various vertical dimensions, a first travelling conveyor belt carried by the main frame, a second travelling conveyor belt carried by the sub-frame and vertically adjustable therewith and with relation to the conveyor belt carried by the main frame, the lower and upper passes of said first and second conveyor belts adapted, respectively, to receive between them cartons fed to them and to contact the lapped end closure flaps at opposite ends of said cartons to thus feed the cartons through the apparatus, means disposed in the apparatus at opposite sides of the cartons fed through the apparatus, and in operative proximity to the upper and lower ends of such cartons, for applying to predetermined joints of certain of the carton end flaps at both ends of such cartons deposits of a fluid sealing compound, the upper of such sealing compound applying means having mounting means whereby they are carried by said main frame, and the lower of said sealing compound applying means having similar mounting means whereby they are carried by the sub-frame, all of said mounting means including elements relatively adjustable to vary the lateral and vertical relations of said sealing compound applying means to the cartons fed therepast by said conveyor belts to thereby accommodate the apparatus to the handling of cartons of various vertical and transverse dimensions, means operative prior to operation of said sealing compound applying means for relieving the stiffness of the folding scores of said ears, means for adjusting said ears to positions angularly outward from the ear-adjacent side walls of the cartons to facilitate operation of said sealing compound applying means, means for applying adhesive to the side-wall-adjacent faces of said ears, means operative prior to operation of said adhesive applying means for erecting said ears into substantially vertical alignment with their respective adjacent side walls, and means operable subsequently to operation of said sealing compound applying means and said adhesive applying means for closing said ears against said adjacent side walls and hence in adhering relation thereto.

8. Apparatus as defined in claim 7, in which pairs of said ear-adjusting means and ear-closing means are disposed opposite each other flanking the path of travel of said cartons with said conveyor belts, and means for adjusting each of the members of said pairs of means vertically and transversely with respect to said path of travel.

9. In apparatus for sealing the closure flaps of cartons, a main frame, a sub-frame and means for vertically adjusting it with respect to said main frame, a conveyor belt mounted upon a drive shaft and a driven shaft carried respectively adjacent to the opposite ends of said main frame, a conveyor belt mounted upon a drive shaft and a driven shaft carried respectively adjacent to the opposite ends of said sub-frame and in longitudinal alignment with the belt of the main frame, the vertical adjustability of said sub-frame with respect to said main frame thus affording adjustability of the vertically adjacent working passes of said belts, lug means carried in similar longitudinally spaced relation on said belts for engaging cartons fed thereto adjacent to their upper and lower ends, the lug means of the two belts being normally in vertical alignment, and drive means for said drive shafts including a drive sprocket on each of said shafts, said sprockets serving to impart synchronous rotation to said shafts and hence synchronous linear travel to the two conveyor belts driven thereby, a drive chain passing over the sprocket of the drive shaft carried by the main frame and extending downwardly therefrom in oppositely travelling passes to idler sprocket means carried by the main frame below the limits of vertical movement of the drive shaft carried by the sub-frame, one pass of said chain engaging the sprocket of the drive shaft carried by the sub-frame and serving to drive it in the opposite direction to that of the drive shaft carried by the main frame so that the vertically adjacent passes of the two conveyor belts will be driven in synchronism in the same direction, and angularly adjustable coupling means between the sprocket for the drive shaft carried by the sub-frame and its said shaft, whereby upon vertical adjustment of said sub-frame said sprocket may have a limited travel on said chain pass without imparting rotation to its shaft and thus be angularly adjustable relative to its shaft while in engagement with said chain pass to thereby maintain the vertical alignment of the lug means of the two conveyor belts.

References Cited by the Examiner
UNITED STATES PATENTS

| | | | |
|---|---|---|---|
| 1,388,422 | 8/21 | Forsman | 53—374 |
| 1,961,646 | 6/34 | Smith | 53—383 |
| 1,974,256 | 9/34 | Bergstein | 53—47 |
| 2,224,716 | 12/40 | Anderson | 53—376 |
| 2,282,278 | 5/42 | Wysong | 53—375 |
| 2,288,720 | 7/42 | Knowlton | 118—259 |
| 2,324,443 | 7/43 | Walter | 53—376 X |
| 2,352,720 | 7/44 | Knowlton | 118—259 |
| 2,390,107 | 12/45 | Kucklinsky | 53—374 |
| 2,640,305 | 6/53 | Genco et al. | 53—374 |
| 2,691,260 | 10/54 | Schlemmer | 53—374 X |
| 2,876,608 | 3/59 | Vergobbi | 53—387 |
| 2,890,559 | 6/59 | Rosen | 53—383 |
| 2,973,608 | 3/61 | Killion | 53—388 X |

FRANK E. BAILEY, *Primary Examiner.*

ROBERT A. LEIGHEY, *Examiner.*